US010980248B2

(12) United States Patent
Ulmer et al.

(10) Patent No.: US 10,980,248 B2
(45) Date of Patent: Apr. 20, 2021

(54) NATURAL FLAVOR BASE AND PROCESS FOR ITS PREPARATION

(71) Applicant: NESTEC S.A., Vevey (CH)

(72) Inventors: Helge Ulmer, Singen (DE); Josef Kerler, Singapore (SG)

(73) Assignee: Societe des Produits Nestle S.A., Vevey (CH)

( * ) Notice: Subject to any disclaimer, the term of this patent is extended or adjusted under 35 U.S.C. 154(b) by 199 days.

(21) Appl. No.: 15/769,623

(22) PCT Filed: Sep. 23, 2016

(86) PCT No.: PCT/EP2016/072695
§ 371 (c)(1),
(2) Date: Apr. 19, 2018

(87) PCT Pub. No.: WO2017/071890
PCT Pub. Date: May 4, 2017

(65) Prior Publication Data
US 2018/0303124 A1    Oct. 25, 2018

(30) Foreign Application Priority Data

Oct. 27, 2015 (EP) ..................................... 15191571

(51) Int. Cl.
| A23J 1/00 | (2006.01) |
| A23L 27/21 | (2016.01) |
| A23L 27/24 | (2016.01) |
| A23J 3/20 | (2006.01) |

(52) U.S. Cl.
CPC ................ *A23J 1/008* (2013.01); *A23J 3/20* (2013.01); *A23L 27/215* (2016.08); *A23L 27/24* (2016.08); *A23V 2002/00* (2013.01); *A23V 2200/15* (2013.01); *A23V 2250/064* (2013.01); *A23V 2250/602* (2013.01); *A23V 2250/606* (2013.01); *A23V 2250/61* (2013.01); *A23V 2250/612* (2013.01); *A23V 2250/616* (2013.01); *A23V 2300/10* (2013.01); *A23V 2300/20* (2013.01); *A23V 2300/24* (2013.01)

(58) Field of Classification Search
CPC . A23J 1/008; A23J 3/20; A23L 27/215; A23L 27/24; A23V 2200/15; A23V 2250/064; A23V 2250/606; A23V 2250/61; A23V 2250/612; A23V 2250/616; A23V 2300/24
See application file for complete search history.

(56) References Cited

U.S. PATENT DOCUMENTS

| 4,224,409 A | 9/1980 | Nakamori et al. |
| 4,444,885 A | 4/1984 | Nakanishi et al. |
| 4,879,130 A | 11/1989 | Heyland et al. |
| 5,476,773 A | 12/1995 | Heyland et al. |
| 2004/0067279 A1* | 4/2004 | Delest ...................... A23J 3/34 426/42 |
| 2004/0191389 A1 | 9/2004 | Kochhar et al. |
| 2015/0223501 A1 | 8/2015 | Huynh-Ba et al. |

FOREIGN PATENT DOCUMENTS

| CL | 48062 | 12/2011 |
| CN | 1052246 A | 6/1991 |
| CN | 102127515 A | 7/2011 |
| CN | 102365032 A | 2/2012 |
| EP | 0098122 A2 | 1/1984 |
| EP | 0357812 A1 | 3/1990 |
| EP | 2119373 | 11/2009 |
| GB | 2077262 | 12/1981 |
| JP | S59120094 A | 7/1984 |
| KR | 20030066950 A | 8/2003 |
| WO | 2009040150 A1 | 4/2009 |
| WO | 2015012464 A1 | 1/2015 |
| WO | 2015012465 A1 | 1/2015 |
| WO | 2015012466 A1 | 1/2015 |
| WO | 2015020292 A1 | 2/2015 |

OTHER PUBLICATIONS

First Examination report for related Chilean Application No. 00876-2018; action dated Jul. 9, 2019; (16 pages).
Blank et al., "Formation of odour-active compounds in Maillard model systems based on proline", Flavour Research at the Dawn of the Twenty-first Century, Proceedings of the 10th Weuman Flavour Research Symposium, 2003, pp. 458-463.
Zheng, "General Biochemistry", Apr. 30, 1982, pp. 559-560.
China Patent Office Action Received for Application No. 201680060906. X, dated Jan. 13, 2021, 19 Pages.

* cited by examiner

*Primary Examiner* — Blaine Lankford
(74) *Attorney, Agent, or Firm* — K&L Gates LLP

(57) ABSTRACT

The present invention relates to a process for preparing a natural flavor base and a flavor base obtainable by such process. A further aspect of the invention is a method for providing a natural roasty, a natural caramel, a natural pop-corn, a natural biscuit and/or a natural buttery flavor note to a food product.

15 Claims, 1 Drawing Sheet

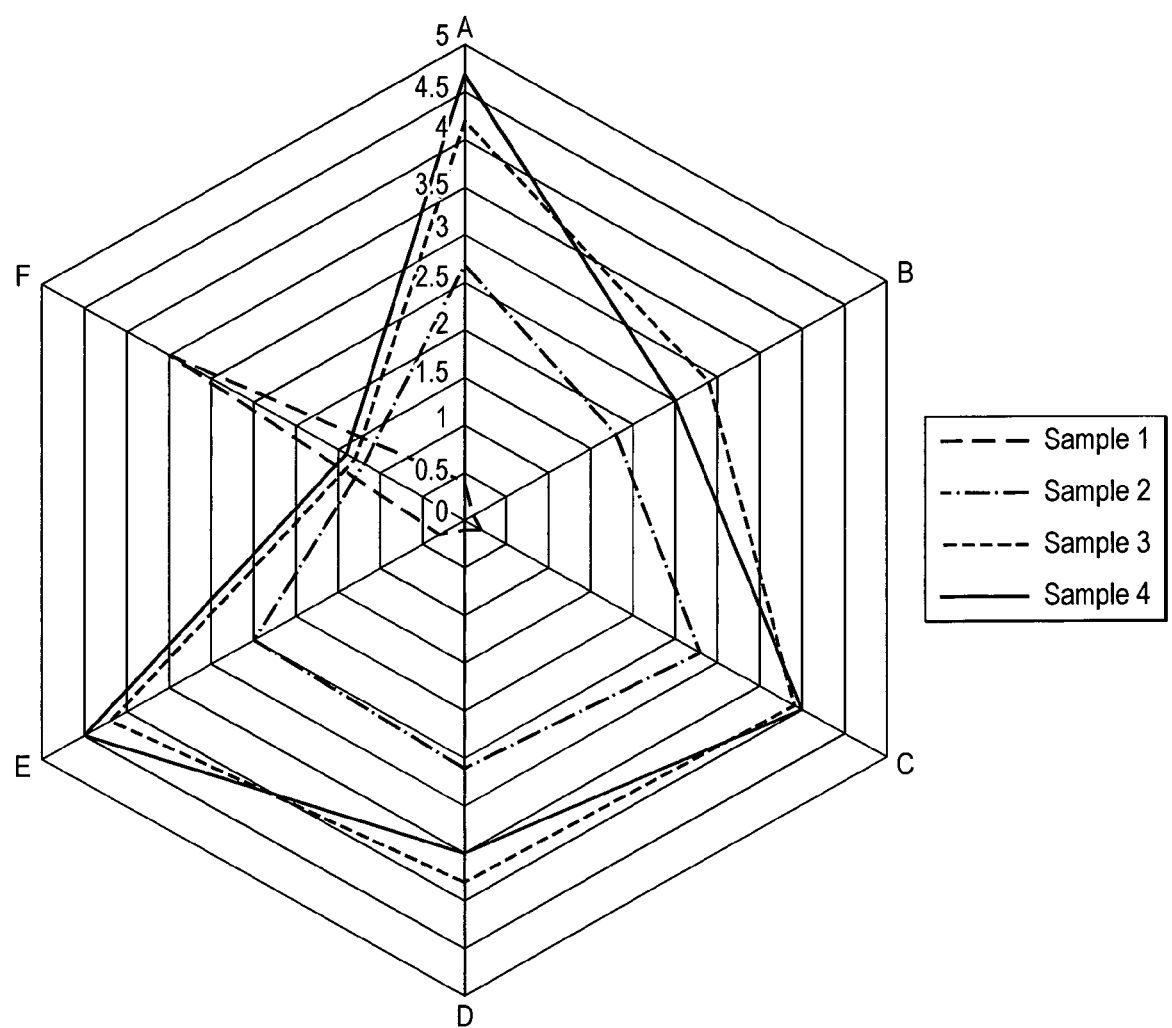

NATURAL FLAVOR BASE AND PROCESS FOR ITS PREPARATION

CROSS REFERENCE TO RELATED APPLICATIONS

The present application is a National Stage of International Application No. PCT/EP2016/072695, filed on Sep. 23, 2016, which claims priority to European Patent Application No. 15191571.7, filed on Oct. 27, 2015, the entire contents of which are being incorporated herein by reference.

The present invention relates to a process for preparing a natural flavor base and a flavor base obtainable by such process. A further aspect of the invention is a method for providing a natural roasty flavor note to a food product.

Additives such as purified amino acids, vitamins or flavor molecules are commonly used to enhance body and taste in flavour reactions and composition in food products. The problem with using these additives, however, is that they are not considered as being natural as they are typically obtained first by purification or chemical synthesis involving one or more non-natural processing steps such as elution from impurities with using chemical eluents, or chemical synthetic reactions.

Natural flavour standards in various countries, including Europe, determine flavours made of only natural components but prepared by performing chemical processes or adding further components as non-natural flavours. An example would be methods for preparing L-cysteine by two steps (fermentation and chemical reduction). For this reason, it is desirable to have flavoring components prepared using natural processes such as fermentation only and omitting any chemical production steps.

WO 2009/040150 discloses a natural shelf-stable taste enhancing savory base produced by fermentation using a microorganism of the genus *Corynebacterium*, *Brevibacterium* or *Bacillus*. The savory base comprises an amount between 10 and 80% by weight of naturally derived compounds such as glutamate, inosine monophosphate (IMP), and guanosine monophosphate (GMP); and further naturally derived compounds selected from the group consisting of organic acids, amino acids, peptides and aroma compounds; and a low fat content of the savory base in the range of 0 to 15% by weight. The disclosed savory base improves the umami taste in food products. However, it does not provide a top-flavor note by itself.

EP0357812 describes a process for improving the flavour of protein products derived from microorganisms which comprises culturing the microorganism in the presence of a flavour enhancing additive, heat treating the resulting ferment, and then drying of same in the absence of a centrifugation. Examples of flavour enhancing additives added during the fermentation are animal by-products (beef extract, pork extract, or chicken extract) or fatty acids produced by adding a dairy product precursor and lipase. The additive is used 0.5-5 wt. %. In this case, the objective is to produce protein-rich food stuff and not an intermediate ingredient rich in precursors that can be used in subsequent flavour reactions.

WO2015020292 relates to a method for preparing an inosine-5'-monophosphate (IMP) fermented broth or a glutamic acid fermented broth as a raw material for preparation of a natural flavour. The method comprises two fermentation steps, a first fungal fermentation step and a second bacterial fermentation step. The IMP fermented broth and glutamic acid fermented broth may be used as raw materials for preparing various natural flavours, for example, neutral flavours (WO2015012466), and flavours for beef (WO2015012464), chicken, pork, kokumi (WO2015012465) and the like. These flavours can be customized by using different raw materials, or slightly changing the medium composition, or controlling process conditions, including temperature, pressure and time, in the process of mixing the fermented broths, or a reaction or electrodialysis process. Having two fermentation steps as described would have the following consequences for an industrial production: (1) the final product is highly sensitive to the changes in raw material characteristics and quality; (2) the control of two fermentation steps involves highly specialized equipment and handling skills; and (3) the performance of the final product depends highly on the initial amount being freed during hydrolysis.

Often, yeast extract as a natural source of amino acids is added to food products, and/or used in thermal reaction flavor processes. An example is provided in U.S. Pat. No. 4,879,130. However, the use of yeast extract usually adds a typical yeasty note or off-flavor to such flavor bases and food products. This is usually not very liked by many consumers, particularly in Europe and the USA.

Hence, there is still a persisting need in the art and the food industry to provide new processes for preparing savory flavor base compositions which provide flavour bases which are considered absolutely natural by consumers and which at the same time can also provide new and more complete and authentic flavour profiles and flavour top-notes.

SUMMARY OF THE INVENTION

The object of the present invention is to improve the state of the art and to provide a new process for preparing a natural savory flavour base which is considered all natural by consumers and which provides an improved and all natural flavour profile to food products. A further object of the present invention is a method for providing a natural and authentic roasty flavor note to a food or seasoning product.

The object of the present invention is achieved by the subject matter of the independent claims. The dependent claims further develop the idea of the present invention.

Accordingly, the present invention provides in a first aspect a process for preparing a natural flavor base composition comprising the steps of:
- culturing a bacterial strain in a culture medium to produce and accumulate L-proline and/or a derivative thereof in the culture medium to a concentration of at least 1.0 wt % of the culture medium;
- optionally separating the bacterial strain from the culture medium after the culturing step;
- optionally concentrating the culture medium after the culturing step;
- adding a reducing sugar to the culture medium after the culturing step;
- thermally reacting the culture medium after the addition of the reducing sugar at a temperature from 75-170° C. for at least 5 minutes;
- optionally concentrating the medium after the thermal reaction step by evaporation or spray drying.

In a second aspect, the invention relates to a natural flavor base obtainable by the process of the present invention.

A third aspect of the invention relates to the use of the present natural flavor base of the present invention for adding a roasty, a caramel, a pop-corn, a biscuit and/or a buttery flavored note to a food product.

A still further aspect of the invention is a method for providing a natural roasty, a natural caramel, a natural pop-corn, a natural biscuit and/or a natural buttery flavored flavor note to a food product comprising the step of adding the natural flavor base of the present invention into the recipe of a said food product.

The inventors found that a culture of a bacterial strain, such as for example a *Corynebacterium glutamicum*, which is cultivated either in such a way that it overproduces L-proline or conditioned in such a way that it overproduces L-proline, can be directly used in a thermal reaction process to generate a savory flavor base which is perceived by consumers as all natural and which has surprisingly even an improved roasty flavor profile in comparison to prior art savory flavor bases. For this new process, a bacterial culture can be taken as such, i.e. without separating the bacterial cells from the culture medium after the fermentation step, or alternatively, the bacterial cells can first be removed from the culture medium after fermentation by sedimentation, centrifugation and/or filtration. For ease of further processing, the culture medium can then be concentrated in order to remove a substantial amount of the water present in the cultured medium. Thus, for example a paste of concentrated cultured medium can be obtained having a residual moisture content of only ca. 5 to 40 wt %. A reducing sugar, for example glucose, can then be added to the concentrated cultured medium and the mixture further processed by thermally reacting the mix at a temperature above 75° C., preferably above 85° C. This thermally induced chemical reaction is also known under the term Maillard reaction. Optionally, the reaction end-product can then be further concentrated, e.g. into a paste, or dried into a powder.

The inventors have surprisingly found that when using this process, natural flavor base compositions can be generated which have a significantly improved roasty flavor note than prior art processes which make use of just regular non-conditioned bacterial fermentation media such as for example described in WO2009/040150, or by using isolated, purified L-proline in Maillard reaction model systems. Evidence thereof is provided here below in the Examples section. Consequently, the present invention provides a new process which has the advantage of being absolute natural, i.e. without the use of and addition of isolated chemicals or molecules, of being relatively cheap and applicable industrially at a large scale, and which provides an even better roasty flavor profile to the resulting flavor base composition.

BRIEF DESCRIPTION OF THE DRAWINGS

FIG. 1: Sensory evaluation of the samples 1-4, labelled 1 to 4 respectively. A stands for roasty, B for buttery, C for biscuit, D for pop-corn, E for caramel flavor, and F for sweet.

DETAILED DESCRIPTION OF THE INVENTION

The present invention relates to a process for preparing a natural flavor base composition comprising the steps of:
  culturing a bacterial strain in a culture medium to produce and accumulate L-proline and/or a derivative thereof in the culture medium to a concentration of at least 1.0 wt % of the culture medium;
  optionally separating the bacterial strain from the culture medium after the culturing step;
  optionally concentrating the culture medium after the culturing step;
  adding a reducing sugar to the culture medium after the culturing step;
  thermally reacting the culture medium after the addition of the reducing sugar at a temperature from 75-170° C. for at least 5 minutes;
  optionally concentrating the medium after the thermal reaction step by evaporation or spray drying.

The term "natural" of the present invention means "made by natural produce", i.e. the flavor base composition is made by fermentation and heat treatment only. Therefore, "natural" also means that the flavor base composition does not comprise and is not made with an addition of artificial chemical compounds such as synthetically produced and/or chemically purified molecules. Examples of such undesired molecules are flavoring compounds, colorants, antimicrobial compounds, vitamins, amino acids, organic acids, alcohols, and esters.

The "culturing a bacterial strain" is by fermentation. Typically, such fermentations are submerged and conducted in closed or open fermentation reactors. The choice and composition of the culture medium depends on the choice of the bacterial strain selected for producing and accumulating L-proline and/or a derivative thereof in said culture medium. Typically, the skilled person familiar with the fermentation processes of a selected bacterial strain knows and can readily compose a culture medium which is appropriate for the respective culturing process.

Preferably, the bacterial strain for the process of the present invention is belonging to a genus selected from *Corynebacterium, Arthrobacter, Brevibacterium, Bacillus* or *Microbacterium*.

In one specific embodiment of the present invention, the derivative of L-proline is hydroxyproline.

In a preferred embodiment, the culturing of the bacterial strain produces and accumulates L-proline and/or a derivative thereof to a concentration of at least 1.5 wt %, more preferably to at least 2.0 wt %, even more preferably to at least 2.5 wt % of the culture medium. Concentrations of L-proline and/or a derivative thereof would more preferably be even above 3 wt %, 4 wt %, 5 wt % or even 10 wt % of the culture medium.

In one embodiment, the process of the present invention further comprises a step of heat inactivation of the bacterial strain after the culturing step. This heat inactivation is done after termination of the fermentation process, i.e. at the end of the growth phase of the bacterial cells in the culture medium, and results in an inactivation of the viability of the bacterial cells, including an inactivation of enzymes which have been released or are still contained within the bacterial cells. Heat inactivation potentially prevents a degradation of the complex composition of the culture medium after the culturing step as to e.g. uncontrolled further growth and/or metabolism of the bacteria and/or uncontrolled further activity of certain enzymes.

In one further embodiment, the bacterial strains are separated from the culture medium after the culturing step, i.e. after the fermentation process. Separation of the bacterial strain from the culture medium can typically be obtained by sedimentation, centrifugation and/or filtration. An advantage of this embodiment may be that further handling of the culture medium in the process of the present invention is easier in an industrial setting. Furthermore, the risk of the bacterial strains to potentially degrade the quality of the achieved culture medium once the fermentation process has been terminated is reduced.

In a still further embodiment, the culture medium can be concentrated after the culturing step. This can be done with or without previous separation of the bacterial strain from the culture medium. Consequently, a concentrated culture medium according to this embodiment may or may not comprise bacterial cells. Preferably, concentrating the culture medium after the culturing step is by partial or total evaporation of water present in the culture medium. Preferably, the resulting concentrated culture medium is in the form of a paste. Such a paste may still have a water content of between 5-40 wt %, preferably of between 15-35 wt %. One of the advantages of this embodiment is that it allows conducting the thermal chemical reaction step together with the reducing sugar in a more concentrated form. Efficiency and yield of such a chemical reaction will be substantially increased.

In one embodiment of the present invention, the reducing sugar added to the culture medium after termination of the culturing step, is a 4, 5 or 6 carbon atoms comprising monosaccharide. Alternatively, a disaccharide reducing sugar can be used as well. Preferably, the reducing sugar is selected from the group consisting of glucose, xylose, ribose, rhamnose, fructose, maltose, lactose, arabinose or a combination thereof. The most preferred sugar is glucose.

In one embodiment of the present process, the reducing sugar is added to the medium in an amount of 1:5 to 10:1 (w/w) ratio sugar:proline, preferably in an amount of 1:1 to 5:1 (w/w) ratio sugar:proline. The ration sugar:proline is to be understood as the (weight/weight) ratio of reducing sugar versus L-proline and/or a derivative thereof. The inventors have found that the addition of reducing sugar to the culture medium after the culturing step within this range of ratio provides the best results as to the generation of a typical desired roasty flavor profile in the following chemical thermal reaction process.

The process of the present invention comprises a step of thermally reacting the culture medium after the addition of the reducing sugar at a temperature from 75-170° C. for at least 5 minutes, preferably at least 10 minutes. This step is a chemical reaction step between different components present in the culture medium after the addition of the reducing sugar and which is thermally induced. This thermal reaction step is also commonly known as Maillard reaction. It is during this thermal reaction step that different precursor molecules from the culture medium react chemically for example with the reducing sugar, resulting in new flavor and taste active molecules. It is finally the ensemble of the selected culture medium of the present invention together with the reducing sugar that provide the full new and improved flavor profile of this natural flavor base after the thermally induced reaction step.

Preferably, the thermal reaction step of the process of the present invention is at a temperature from 85-150° C., more preferably from 95-130° C.

In a further embodiment of the present invention, the culture medium, after the addition of the reducing sugar and after the thermal reaction step, is dried to a powder. Drying can for example be achieved by spray drying or vacuum drying. Advantageously then, the obtained natural flavor base composition can be better integrated into non-liquid seasoning products such as e.g. seasoning powders or seasoning tablets.

A further aspect of the present invention is a natural flavor base obtainable by the process of the present invention. As evidence is provided below, this new natural flavor base has an improved roasty flavor note and is therefore distinguishable from similar prior art flavor bases. Particularly, it has been observed by the inventors that this new natural flavor base has further improved caramel, pop-corn, biscuit and buttery flavor notes as compared to respective reference flavor base products.

A still further aspect of the present invention is the use of the present natural flavor base for adding a roasty, a caramel, a pop-corn, a biscuit and/or a buttery flavored note to a food product. Preferably, the food product is selected from the group consisting of culinary soups, noodles, bouillons, sauces, seasonings, ready-to-eat meal preparations, instant and ready-to-drink beverage preparations, cookies, cakes, snacks, dough products and wafers. Preferably, the culinary soups, bouillons, sauces or seasonings products of the present invention are in the form of a powder, liquid, granulated product, tablet or paste. Furthermore, where the food product is a ready-to-eat meal preparation, a snack or a dough product, it is preferably frozen.

A still further aspect of the present invention is a method for providing a natural roasty, a natural caramel, a natural pop-corn, a natural biscuit and/or a natural buttery flavor note to a food product, comprising the step of adding the natural flavor base of the present invention into the recipe of said food product. Preferably, the method is for providing a natural roasty flavor note to a food or culinary seasoning product.

Those skilled in the art will understand that they can freely combine all features of the present invention disclosed herein. In particular, features described for the process for preparing the natural flavor base composition of the present invention can be combined with the flavor base obtainable by the process, the use of said flavor base and the method for use of said flavor base, and vice versa. Further, features described for different embodiments of the present invention may be combined.

Further advantages and features of the present invention are apparent from the figures and examples.

Example 1

A cultured medium with a *Corynebacterium* was prepared as basically described in WO2009/040150. Thereby, a bacterial *Corynebacterium glutamicum* strain was grown in a culture medium comprising glucose as substrate for growth, at pH 6-7 and temperature 37° C. for about 36 hours.

Thereafter, the bacterial strain was inactivated with a heat treatment and the bacterial cells separated from the fermentation medium by filtration. The filtrate, presenting the cultured medium, was then concentrated into a powder by spray-drying.

The obtained cultured medium powder had an amino acid and natural organic acid composition as shown in Table 1. The respective amounts are provided in % w/w of total culture medium after fermentation and filtration, but before concentration.

TABLE 1

| Composition based on dry matter | |
|---|---|
| Component | % w/w |
| Amino acids | |
| Cystine | 0.19 |
| Tyrosine | 0.06 |
| Arginine | 0.38 |
| Alanine | 0.36 |
| Aspartic Acid | 0.05 |
| Glutamic Acid | 11.05 |

TABLE 1-continued

Composition based on dry matter

| Component | % w/w |
|---|---|
| Proline | 0.22 |
| Organic acids | |
| Acetic acid | 1.95 |
| Lactic acid | 0.90 |
| Citric acid | 0.50 |

Technically pure L-proline (from Sigma-Aldrich Pte Ltd, Singapore) was then added to the powdered cultured medium to achieve a total concentration of L-proline of 30 wt % (w/w based on dry matter) of the culture medium. The powder with the L-proline was then dissolved in water to give a 10% (w/w) solution. Thereafter, 9 wt % glucose was added to the solution, resulting in a reconstituted culture medium with added glucose having a glucose:proline ratio of 3:1. The mixture was then subjected to a thermal heat reaction for 20 min to 120° C., and cooled thereafter to room temperature. It will be referred to as sample 1.

Example 2

A reference sample with an equivalent amount of pure L-proline in a buffered aqueous solution (i.e. 3 wt % solution at pH 6.5) was prepared. 9 wt % glucose was added to the L-proline solution resulting in a glucose-proline solution in water with a same glucose:proline ratio of 3:1 as the culture medium mixture in Example 1. This reference sample was then subjected to the same thermal heat reaction for 20 min to 120° C. as the mixture in Example 1, and then cooled thereafter to room temperature. It will be referred to as sample 2.

Example 3

A further reference sample was prepared where the cultured medium with the *Corynebacterium glutamicum* strain of Example 1 was used without the addition of L-proline. The powdered culture medium after the spray-drying was dissolved in water to give a 10% (w/w) solution. Thereafter, 9 wt % glucose was added to the solution. The reconstituted cultured medium has a concentration of natural L-proline of 0.02 wt %. Consequently, the culture medium with the added glucose has a glucose:proline ratio of 9:0. The mixture was then subjected to a thermal heat reaction for 20 min to 120° C., and cooled thereafter to room temperature. It will be referred to as sample 3.

Example 4

A further sample was prepared where the cultured medium with a *Corynebacterium glutamicum* naturally overproducing L-proline was used. No additional L-proline was added. A cultured medium comprising 3 wt % L-proline was obtained. The culture medium was spray-dried and thereafter dissolved in water to give a 10% (w/w) solution. Thereafter, 9 wt % glucose was added to the solution. The powdered cultured medium had a concentration of natural L-proline of 30 wt %. Consequently, the culture medium with the added glucose had a glucose:proline ratio of 3:1. The mixture was then subjected to a thermal heat reaction for 20 min to 120° C., and cooled thereafter to room temperature. It will be referred to as sample 4.

Example 5

The samples 1 to 4 were subjected to a sensory evaluation by a six-member trained panel. The obtained reacted mixtures were split into 12 tasting cups. In the first tasting round the panel members were asked to come up with flavour descriptors they associate with the samples tasting them. After that the panel members agreed on six key descriptors for the samples (roasty, butter, biscuit, pop-corn, caramel and sweet). In a second tasting round the panel members had to judge on the strength of the perceived flavour in the samples and marking it on a scale from 1-5 (1 for very low; 2 for low; 3 for medium; 4 for high; 5 for very high). The average of all responses was calculated and is depicted in the FIG. 1.

The sensory results clearly revealed a significantly stronger flavour development for 5 descriptors, namely roasty, buttery, biscuit, pop-corn and caramel, for the two samples 1 and 4 containing the cultured medium together with the L-proline. The solution with an equal amount of L-proline in water (sample 2) as well as the reference cultured medium sample without L-proline (sample 3) were clearly inferior in flavour development as to those 5 descriptors. As expected, sweet was the dominant descriptor for sample 3, where there was 9% of reducing sugar present in the reconstituted cultured medium and no L-proline.

Consequently and surprisingly, L-proline in the context with a bacterial cultured broth provides a much stronger and typical top-note flavour profile when reacted with a reducing sugar, than when reacted in equal molar concentration with a same and also equal amount of a same reducing sugar in just water.

Consequently, it can be concluded from the results presented in FIG. 1 that a process comprising a culture medium comprising an elevated amount of natural L-proline, produced and accumulated through cultivation of a bacterial strain, and thereafter thermally reacted in the presence of a reducing sugar, provides a natural flavour base which has much stronger and typical top-flavor notes related to e.g. roasty, biscuit and pop-corn flavors, than what could be expected from the prior art (Blank et al.; Formation of odour-active compounds in Maillard model systems based on proline; Flavour Research at the Dawn of the Twenty-first Century; Proceedings of the 10$^{th}$ Weuman Flavour Research Symposium; Edited by J. L. Le Quéré and P. X. Etiévant; Lavoisier, Intercept 2003, pages 458-463).

Example 6

A culture medium from *Corynebacterium* sp. which has an increased amount of L-proline can be obtained as disclosed in KR2003/0066950. Alternatively, a culture medium comprising a large amount of L-proline can be obtained by culturing a *Corynebacterium* under the conditions as specified in JP59120094. A still further alternative could be to culture a mutant *Corynebacterium* or mutant *Brevibacterium* strain to produce a culture medium with an elevated amount of L-proline as disclosed in EP0098122. A total of 2-3 wt % L-proline could thus be accumulated in the culture medium. Similarly, a bacterial strain belonging to the genus *Corynebacterium, Arthrobacter, Brevibacterium* or *Microbacterium* could be used for the same purpose as disclosed in U.S. Pat. No. 4,444,885. A total of 2-4 wt % L-proline could be accumulated in this way. A still further alternative would be to obtain a culture medium with accumulated L-proline as disclosed in U.S. Pat. No. 4,224,409.

The culture medium with accumulated free L-proline can be further processed first for example by a heat treatment. Such a heat treatment can be for 1-5 min at a temperature of ca. 120° C.

Thereafter, the bacterial cells can be separated from the culture medium by a standard filtration step as known in the art, and further concentrated by evaporation of the water from the medium. The culture medium is then present in the form of a thick paste with a water content ranging from 20-25 wt %. The paste can then be stored at 4° C. until further processing.

The culture medium can be reconstituted again from the paste in water and glucose, as a reducing sugar, which can be added to the medium in an amount to result in a sugar:proline ratio of for example 2:1 or 4:1. The mixture can then be reacted under thermal conditions of 125° C. for 25 min in a reaction vessel. Thereafter, the mixture is cooled down again to room temperature and dried into a powder via spray-drying, to result in a natural flavour base composition which can be used in food products.

Sensory analysis as described above in Example 5 can be conducted on this flavour base for example with a trained tasting panel. Such sensory results will reveal significant stronger flavour development for at least the 5 descriptors mentioned above if compared to reference samples with only L-proline, sugar and water, or with using standard bacterial culture medium without the elevated accumulation of L-proline.

The invention claimed is:

1. A process for preparing a natural savory flavor base composition, the process comprising:
    culturing a bacterial strain in a culture medium to produce and accumulate L-proline and/or a derivative thereof in the culture medium to a concentration of at least 1.0 wt % of the culture medium;
    adding a reducing sugar to the culture medium after the culturing of the bacterial strain; and
    thermally reacting the culture medium, after the adding of the reducing sugar, at a temperature from 75-170° C. for at least 5 minutes;
    wherein the reducing sugar is added to the culture medium in an amount of 1:5 to 10:1 (w/w) ratio sugar:proline.

2. The process according to claim 1, wherein the bacterial strain belongs to a genus selected from the group consisting of *Corynebacterium*, *Arthrobacter*, *Brevibacterium*, *Bacillus* and *Microbacterium*.

3. The process according to claim 1, wherein the derivative of L-proline is hydroxyproline.

4. The process according to claim 1, wherein the culturing of the bacterial strain produces and accumulates the L-proline and/or derivative thereof to a concentration of at least 1.5 wt % of the culture medium.

5. The process according to claim 1, comprising a step of heat inactivation of the bacterial strain after the culturing of the bacterial strain.

6. The process according to claim 1, further comprising separating the bacterial strain from the culture medium after the culturing of the bacterial strain, the separating comprises a process selected from the group consisting of sedimentation, centrifugation and filtration.

7. The process according to claim 1, further comprising concentrating the culture medium after the culturing of the bacterial strain, the concentrating comprises partial or total evaporation of water present in the culture medium.

8. The process according to claim 1, wherein the reducing sugar is selected from the group consisting of glucose, xylose, ribose, rhamnose, fructose, maltose, lactose, arabinose and combinations thereof.

9. The process according to claim 1, wherein the thermal reaction step is at a temperature from 85-150° C.

10. The process according to claim 1, further comprising drying the culture medium, after the thermal reaction step, to a powder.

11. The process according to claim 1, wherein the natural savory flavor base composition has at least one of a roasty flavor, a caramel flavored note, a popcorn flavored note, a biscuit flavored note or a buttery flavored note.

12. The process according to claim 1, wherein culturing the bacterial strain produces and accumulates the L-proline and/or derivative thereof to a concentration of at least 2.5 wt % of the culture medium.

13. The process according to claim 7, wherein the concentrated culture medium has a water content of 5-40 wt %.

14. The process according to claim 1, wherein the reducing sugar is added to the culture medium in an amount of 1:1 to 5:1 (w/w) ratio sugar:proline.

15. The process according to claim 1, wherein the thermal reaction step is at a temperature from 95-130° C.

* * * * *